United States Patent [19]

Indo et al.

[11] Patent Number: 4,663,853

[45] Date of Patent: May 12, 1987

[54] MECHANISM FOR MOUNTING MEASURING SYSTEM USING MAGNETIC SCALE

[75] Inventors: Kenji Indo; Yoshihiko Ishimaru, both of Hadano, Japan

[73] Assignee: Sokkisha Co., Ltd., Tokyo, Japan

[21] Appl. No.: 759,663

[22] Filed: Jul. 26, 1985

[30] Foreign Application Priority Data

Aug. 2, 1984 [JP]  Japan .................... 59-119835[U]

[51] Int. Cl.⁴ ................................................ G01B 7/04
[52] U.S. Cl. ..................................... 33/125 C; 324/208
[58] Field of Search .......................... 33/125 R, 125 C; 324/208

[56] References Cited

U.S. PATENT DOCUMENTS

| | | | |
|---|---|---|---|
| 3,816,003 | 6/1974 | Litke | 33/125 C |
| 4,031,595 | 6/1977 | Welker | 33/125 C |
| 4,250,381 | 2/1981 | Yoshiike et al. | 33/125 C |

FOREIGN PATENT DOCUMENTS

| | | | |
|---|---|---|---|
| 2714521 | 5/1978 | Fed. Rep. of Germany. | |
| 1950313 | 2/1980 | Fed. Rep. of Germany | 33/125 R |
| 2040462 | 8/1980 | United Kingdom | 33/125 C |

Primary Examiner—Richard R. Stearns
Attorney, Agent, or Firm—Frishauf, Holtz, Goodman & Woodward

[57] ABSTRACT

A measuring system using a magnetic scale is disclosed, which can be readily adjusted when mounting it on a machine tool or the like. A magnetic scale support supporting a magnetic scale bar is secured to a machine tool body. A magnetic head support supporting a magnetic head is secured to a movable member of the machine tool body. An adjusting member secured to the magnetic scale support has a projection, while a cap secured to the magnetic scale support has a recess extending parallel to the magnetic scale bar. The mounting position of the magnetic scale bar in the direction of movement of the movable member is adjusted by moving the movable member, with the projection inserted in the recess.

7 Claims, 5 Drawing Figures

MECHANISM FOR MOUNTING MEASURING SYSTEM USING MAGNETIC SCALE

BACKGROUND OF THE INVENTION

This invention relates to a measuring system using a magnetic scale and, more particularly, to a mounting mechanism for mounting the measuring system on a machine tool, for instance.

As is well known in the art, a measuring system using a magnetic scale has been utilized in various fields due to its high accuracy of measurement, and recently it is extensively used in the fields of automatic control. This type of measuring system is actively applied to machine tools from the standpoint of the accuracy of machining works.

Usually, a measuring system using a magnetic scale is mounted on a machine tool in the manner as shown in FIGS. 1 and 2. Referring to FIGS. 1 and 2, reference numeral 11 designates a machine tool body, e.g., a cutter. A movable member 12 with a cutting blade (not shown) is supported on top 11a of the machine tool body 11 such that it can be moved in the directions of arrows A and B. Reference numeral 13 designates a work holder, to which a workpiece (not shown) is secured.

A magnetic head support 14 is coupled at one end to the movable member 12. To the other end of the magnetic head support 14 is coupled a magnetic head support frame 16, in which a magnetic head 15 of the known type is provided. The magnetic head 15 is a flux-sensitive multi-gap head. The multi-gap head consists of a plurality of (usually about 30) single-gap heads arranged in a row at a pitch of $\lambda m/2$ ($\lambda$ being referred to as the specific wavelength of the multi-gap head, and m being an integer) such that they are electrically connected in series, each having a polarity opposite to that of either adjacent single-gap head.

A magnetic scale support 17 is secured by a screw 18 to the machine tool body 11. The magnetic scale support 17 is a hollow angular elongated member having substantially a rectangular sectional profile. A magnetic scale bar 19 is provided in the magnetic scale support 17. The magnetic scale bar 19 is a straight magnetic medium bar, for instance made of a Fe-Co alloy. It has a sinusoidal magnetization pattern having a regular pitch. Its opposite ends are secured by securement members 20 to the magnetic scale support 17.

As shown in FIG. 3, the magnetic head 15 is accommodated in the magnetic head support frame 16 coupled to an end of the magnetic head support 14. The magnetic head 15 has a see-through hole 15a, which is slightly greater in sectional size than, and loosely penetrated by, the magnetic scale bar 19.

When the movable member 12 is moved, the magnetic head 15 is moved along the magnetic scale bar 19, and the magnetic head 15 provides a signal corresponding to the extent of movement of the movable member 12. The signal obtained from the magnetic head 15 is coupled to a signal processing circuit and a digital display unit or the like (not shown) through a cable 21 extending along the magnetic head support 14, so that the extent of movement of the movable member 12 is displayed on the display unit.

The above prior art mounting mechanism for mounting the measuring system on the machine tool, however, has a problem. That is, since the movable member 12 of the machine tool 11 is moved straight in horizontal directions, i.e., directions of arrows A and B in FIG. 1, the magnetic scale 19 has to be installed such that it extends accurately parallel to the direction of movement of the movable member 12.

In the prior art, a dial gauge is installed on the movable member 12 of the machine tool 11 for determining the position of a reference plane of the magnetic scale support 17 and adjusting the magnetic scale bar 19 such that it is parallel with the direction of movement of the movable member 12. This adjustment, however, requires a high precision that the parallelness error of the magnetic scale bar 19 with the direction of movement of the movable member 12 is held within approximately 0.1 mm. The adjusting operation, therefore, is difficult and time-consuming.

SUMMARY OF THE INVENTION

The invention has been intended in the light of the above situation, and it has an object of providing a mechanism for mounting a measuring system using a magnetic scale, which is simple in construction and permits ready mounting of the measuring system with high precision with the provision of first engaging means on a movable member movably supported by, for instance, a frame of a machine tool and second engaging means on the magnetic scale support, the second engaging means extending along the magnetic scale bar and capable of being engaged with the first engaging means, such that the parallelness of the magnetic scale bar and the direction of movement of the magnetic head is adjusted by moving the movable member with the first and second engaging means in engagement with each other.

A second object of the invention is to provide a mechanism for mounting a measuring system using a magnetic scale, the first engaging means is provided on an adjusting member removably provided on the movable member so that the adjusting member can be removed after adjustment to eliminate any unnecessary load for the movement of the movable member during the operation of the machine tool.

A third object of the invention is to provide a mechanism for mounting a measuring system using a magnetic scale, in which the adjusting member is secured to the magnetic scale support as well as to the movable member to thereby prevent occasional movement of the magnetic head and damage to the magnetic scale bar during transportation of the mechanism.

A fourth object of the invention is to provide a mechanism for mounting a measuring system with a magnetic scale, which has a display unit and a cover and makes it easy to accurately monitor the value measured by the system. The display unit is provided between a movable member and an adjusting member. The display unit displays the distance over which the movable member has moved. The cover prevents dust from reaching the display unit from a workpiece. Hence, the value measured by the measuring system can be monitored accurately.

According to one aspect of the present invention, there is provided a mechanism for mounting a measuring system using a magnetic scale, which comprises a machine tool body supporting a movable member, a magnetic scale support secured to the machine tool body and supporting a magnetic scale, a magnetic head support mounted on the movable member supported in the machine tool body, a magnetic head mounted on the magnetic head support and movable along the magnetic scale in an interlocked relation to the movement of the movable member, first engaging means provided on the magnetic head support, and second engaging means provided on the magnetic scale support along the magnetic scale and engageable with the first engaging means, wherein the mounting position of the magnetic scale in the direction of movement of the movable member being adjustable by moving the movable member with the first and second engaging means in engagement with each other.

DETAILED DESCRIPTION OF THE PREFERRED EMBODIMENTS

Figure 1:
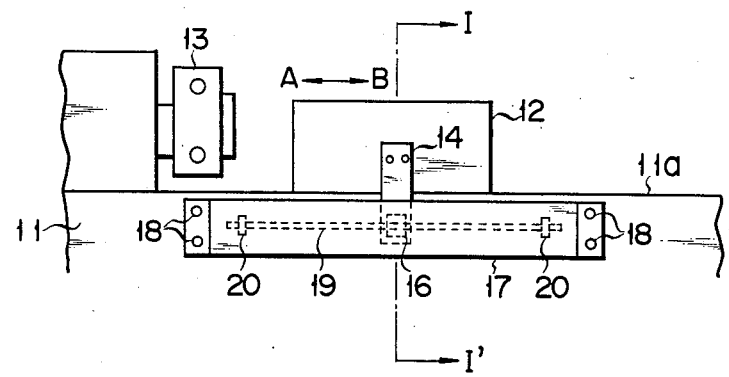
FIG. 1 is a side view showing prior art mounting means for mounting a measuring system employing a magnetic scale in a machine tool.
Figure 2:
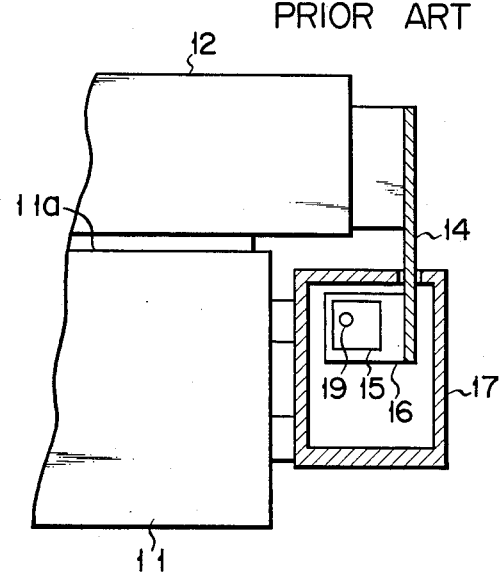
FIG. 2 is a sectional view taken along line I—I' in FIG. 1.
Figure 4:
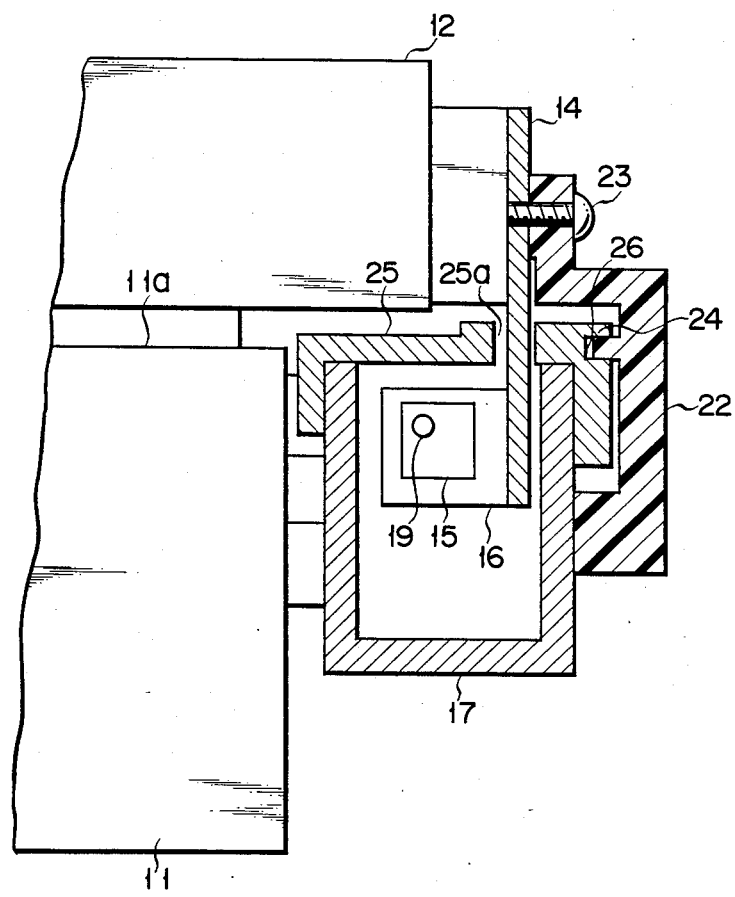
FIG. 4 is a sectional view showing an embodiment of the mechanism for mounting a measuring system employing a magnetic scale according to the invention.

Now, an embodiment of the invention will be described in detail with reference to the drawings. Referring to FIG. 4, parts like those in FIGS. 1 and 2 are designated by like reference numerals, and only the portion of the structure which differs from that described above will be described. An adjusting member 22 made of a synthetic resin material is secured at one end by a screw 23 to magnetic head support 14 mounted on a movable member 12 of the machine tool body 11. The adjusting member 22 can be taken out from the magnetic head support 14 by removing the screw 23.

The other end of the adjusting member 22, which is mounted by the screw 23 on the magnetic head support 14, is in contact with a surface of the magnetic scale support 17. The adjusting member 22 has a projection 24 projecting substantially from a central portion.

The magnetic scale support 17 is open at the top. The open top of the magnetic scale support 17 is closed by a cap 25. The cap 25 has a slot 25a, and its side is formed with a recess 26, in which the projection 24 of the adjusting member 22 is engaged. The recess 26 of the cap 25 extends parallel to magnetic scale bar 19 provided in the magnetic scale support 17.

The measuring system having the above structure is mounted on a machine tool as follows. To mount the magnetic scale support 17 on the machine tool body 11, the screw 18 (FIG. 1) is made slightly loose in advance. That is, the magnetic scale support 17 is temporarily mounted on the machine tool body 11 so that it has slight play.

Then, the adjusting member 22 is secured by the screw 23 to the magnetic head support 14. At this time, the projection 24 of the adjusting member 22 is inserted in recess 26 of the cap 25. Subsequently, the movable member 12 is moved, manually for instance, for fine adjustment of the magnetic scale support 17 such that the projection 24 can move smoothly in the recess 26. Then, the magnetic scale support 17 is secured by tightening the screw 18. In this way, the magnetic scale bar 19 is made parallel to the direction of movement of the movable member 12.

With the above construction, there is no need to adjust the magnetic scale bar 19 to be parallel with the direction of movement of the movable member 12 with high precision, using a dial gauge as in the prior art. The adjusting operation thus can be facilitated, and the measuring system can be mounted with high precision. Since the adjusting member 22 can be removed by loosening the screw 23, by removing it after the adjusting operation, it is possible to prevent the application of unnecessary force against the movement of the movable member 12 during the operation of the machine tool due to the friction between the projection 24 and recess 26 and friction between the adjusting member 22 and magnetic scale support 17.

In the above embodiment, the recess 26 is formed in the cap 25 fitted on the magnetic scale support 17. It may also be formed in the magnetic scale support 17 itself. Further, the projection 24 may also be formed on the magnetic head support 14.

Figure 5:
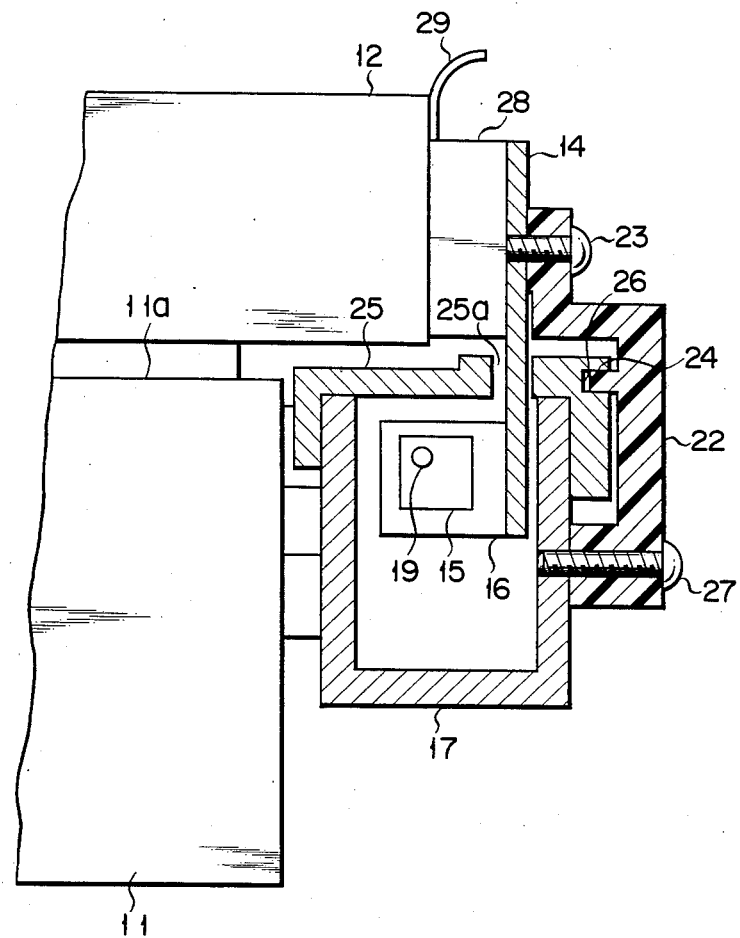
FIG. 5 is a sectional view showing a different embodiment of the invention.

FIG. 5 shows a further embodiment of the invention. In this instance, adjusting member 22 and magnetic scale support 17 are secured to each other by a screw 27. By so doing, it is possible to prevent undesired movement of the magnetic head 15 and damage to the magnetic scale bar 19 during transport or the like.

Figure 3:
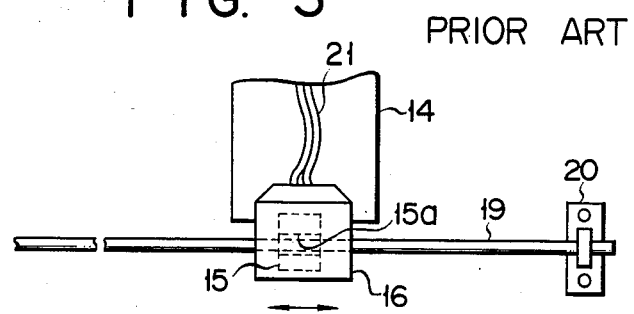
FIG. 3 is a sectional view showing a positional relationship between a magnetic head and magnetic scale.

Usually, the measuring system using a magnetic scale is not mounted on the machine tool at the time of the shipment thereof, and it is mounted after the machine tool has been installed. In other words, the machine tool and measuring system are often transported separately. The measuring system is transported with the magnetic head 15 in a unified state, i.e., with the magnetic head 15 mounted in the magnetic scale support 17 with the magnetic scale bar 19 inserted through 15a (see FIG. 3). If the system is transported in this state, the magnetic scale bar 19 will be damaged with the movement of the magnetic head 15.

In this embodiment, the magnetic head 15 and magnetic scale support 17 may be secured to each other via the adjusting member 22 by securing the adjusting member 22 and magnetic head support 14 to each other with the screw 23 and securing the adjusting member 22 and magnetic scale support 17 with each other with the screw 27.

In the embodiment of FIG. 5, a digital display section 28 is provided between the movable member 12 and magnetic head support 14. The digital display section 28 displays the extent of movement of the movable member 12 according to a signal obtained from the magnetic head 15. The digital display section 28 suitably has six display digits with three decimal digits so that it displays 1 $\mu$.

With this digital display section 28 provided between the movable member 12 and magnetic head support 14 for displaying the extent of movement of the movable member 12, the measured value can be readily supervised. The digital display section 28 may be covered by a dust-proof cover 29 to prevent dust, discharged from the movable member 12, reaching the digital display section 28.

What is claimed is:

1. A mechanism for mounting a measuring system using a magnetic scale comprising:
   a movable member;

a machine tool body including means for supporting said movable member for movement along a given direction;

a magnetic scale support secured to said machine tool body and supporting a magnetic scale;

a magnetic head support mounted on said movable member supported in said machine tool body;

magnetic head mounted on said magnetic head support for movement along said magnetic scale in an interlocked relation to the movement of said movable member;

first engaging means provided on said magnetic scale support being linear and elongated along a line substantially parallel to said magnetic scale;

second engaging means provided on said magnetic head support in slidable engagement with said first engaging means for adjusting the position of said magnetic scale support in response to movement of the movable member relative to the tool body to align said magnetic scale substantially parallel to said given direction; and means for intially loosely securing said magnetic scale support to said machine tool body, and for tightening said magnetic scale support to said machine tool body when the magnetic scale has been aligned with said given direction.

2. The mechanism according to claim 1, wherein said second engaging means is formed on an adjusting member removably mounted on said movable member, said adjusting member being removed from said movable member after completion of adjustment.

3. The mechanism according to claim 2, wherein said adjusting member is secured to said magnetic head support and removably secured to said magnetic scale support.

4. The mechanism according to claim 3, which further comprises a display section provided between said movable member and said magnetic head support, for displaying the extent of movement of said movable member.

5. The mechanism according to claim 4, which further comprises a dust-proof cover for protecting said display section from dust.

6. The mechanism according to claim 11, wherein said first engaging means is a groove, and wherein said second engaging means is a projection received in said groove.

7. The mechanism according to claim 6, wherein adjustment of said magnetic scale occurs in one plane parallel to another plane which includes the magnetic scale and which is perpendicular to said given direction, and wherein the groove is open in a direction perpendicular to said other plane.

* * * * *